US012722185B1

(12) United States Patent
Wodek et al.

(10) Patent No.: US 12,722,185 B1
(45) Date of Patent: Sep. 1, 2026

(54) SYSTEM AND METHOD FOR SEPARATION AND SORTING OF POST-CONSUMER TEXTILES

(71) Applicant: WM INTELLECTUAL PROPERTY HOLDINGS, L.L.C., Houston, TX (US)

(72) Inventors: Paul Jacob Wodek, Cave Creek, AZ (US); Raymond Davis Randall, Winter Park, FL (US)

(73) Assignee: WM INTELLECTUAL PROPERTY HOLDINGS, L.L.C., Houston, TX (US)

( * ) Notice: Subject to any disclaimer, the term of this patent is extended or adjusted under 35 U.S.C. 154(b) by 0 days.

(21) Appl. No.: 19/453,962

(22) Filed: Jan. 20, 2026

Related U.S. Application Data

(60) Provisional application No. 63/746,633, filed on Jan. 17, 2025.

(51) Int. Cl.
*B07C 5/34* (2006.01)
*B07C 5/342* (2006.01)
*G05B 13/02* (2006.01)

(52) U.S. Cl.
CPC ............ *B07C 5/3412* (2013.01); *B07C 5/342* (2013.01); *G05B 13/027* (2013.01)

(58) Field of Classification Search
CPC ...... B07C 5/3412; B07C 5/342; G05B 13/027
See application file for complete search history.

(56) References Cited

U.S. PATENT DOCUMENTS 3,732,034 A 5/1973 Reid et al.
3,848,813 A 11/1974 Stanczyk et al.
3,934,394 A 1/1976 Garrison
(Continued)

FOREIGN PATENT DOCUMENTS

BE 1028913 A1 7/2022
CA 3035602 3/2018
(Continued)

OTHER PUBLICATIONS

Spyridis, Yannis et al., Autonomous AI-enabled Industrial Sorting Pipeline for Advanced Textile Recycling; Apr. 29, 2024; 7 pages.
(Continued)

*Primary Examiner* — Kyle O Logan
(74) *Attorney, Agent, or Firm* — Greenberg Traurig LLP

(57) ABSTRACT

Textile sorting systems and methods are described herein. The system may be configured to sort textiles using a plurality of sorting subsystems to increase the percentage of textiles recycled. In some non-limiting embodiments, the sorting subsystems may employ machine learning modules, artificial intelligent (AI), digital product passports, and market data to granularly sort the textiles. The systems may include optic-based sensors, such as near-infrared, visible, and hyperspectral subsystems, metal detection subsystems, and digital tag reading subsystems. The output from each subsystem may be used to generate attribute profile of a clothing item and to designate the clothing item to particular separation bunker. The subsystems may be communicably coupled such that an output of a subsystem may override a bunker designation for the clothing item from another subsystem.

20 Claims, 4 Drawing Sheets

(56) References Cited

U.S. PATENT DOCUMENTS 4,065,282 A 12/1977 Morey
4,191,511 A 3/1980 Stewart et al.
4,227,849 A 10/1980 Worthington
4,236,222 A 11/1980 Loshbough et al.
4,362,097 A 12/1982 Rogers
4,454,028 A 6/1984 Vetter et al.
4,460,131 A 7/1984 Cerroni
4,612,078 A 9/1986 Karp
4,730,790 A 3/1988 Williams
4,742,880 A 5/1988 Schrag et al.
4,874,134 A 10/1989 Wiens
5,071,075 A 12/1991 Wiens
5,101,977 A 4/1992 Roman
5,148,758 A 9/1992 Saly et al.
5,150,307 A * 9/1992 McCourt .................. B07C 5/34 700/223
5,184,780 A 2/1993 Wiens
5,213,593 A 5/1993 White, Jr.
5,250,100 A 10/1993 Armbristor
5,333,738 A 8/1994 Fuchs et al.
5,411,147 A 5/1995 Bond
5,551,218 A 9/1996 Henderson et al.
5,565,846 A 10/1996 Geiszler et al.
5,610,516 A 3/1997 Maier
5,649,785 A 7/1997 Djerf et al.
6,021,712 A 2/2000 Harrop
6,123,017 A 9/2000 Litle et al.
6,136,590 A 10/2000 Kruse
6,138,557 A 10/2000 Brown et al.
6,139,280 A 10/2000 Holt et al.
6,199,702 B1 3/2001 Buer
6,217,288 B1 4/2001 Mirsky et al.
6,230,780 B1 5/2001 Rietheimer
6,250,472 B1 6/2001 Grubbs et al.
6,264,038 B1 7/2001 Schmidt
6,378,276 B1 4/2002 Dorge et al.
6,474,228 B1 11/2002 Leupe et al.
6,527,206 B1 3/2003 Wuebbels et al.
6,578,783 B2 6/2003 Simon et al.
6,593,853 B1 7/2003 Barrett et al.
6,633,798 B2 10/2003 Daniel et al.
6,787,713 B2 9/2004 Kuechenmeister et al.
6,974,097 B2 12/2005 Simon et al.
7,146,294 B1 12/2006 Waitkus, Jr.
7,293,415 B2 11/2007 Hoffmann et al.
7,389,880 B2 6/2008 Goldmann et al.
7,406,402 B1 7/2008 Waitkus, Jr.
7,503,513 B2 3/2009 Simon et al.
7,584,856 B2 9/2009 Miller et al.
7,674,055 B2 3/2010 Hiroike et al.
7,685,192 B1 3/2010 Scofield et al.
7,728,730 B2 6/2010 Langlois et al.
7,743,699 B1 6/2010 Freeman et al.
7,810,646 B2 10/2010 Miller et al.
7,892,500 B2 2/2011 Carner
7,897,884 B2 3/2011 Harish
7,957,937 B2 6/2011 Waitkus, Jr.
7,983,929 B2 7/2011 Zimmerman
8,006,734 B2 8/2011 Hajny et al.
8,046,192 B2 10/2011 Mcclain
8,146,841 B2 4/2012 Andela
8,162,213 B2 4/2012 Larson et al.
8,165,890 B2 4/2012 Roberts
8,165,891 B2 4/2012 Roberts
8,211,211 B1 7/2012 Knaebel
8,275,630 B2 9/2012 Dunning
8,285,681 B2 10/2012 Prahlad et al.
8,311,975 B1 11/2012 Gonsalves
8,322,639 B2 12/2012 Gitschel
8,362,903 B2 1/2013 Lindh et al.
8,371,214 B1 2/2013 Correale et al.
8,392,135 B2 3/2013 Mcclain et al.
8,393,558 B2 3/2013 Gitschel
8,398,006 B2 3/2013 Gitschel
8,459,466 B2 6/2013 Duffy et al.
8,579,997 B2 11/2013 Bai
8,684,288 B2 4/2014 Gitschel
8,812,971 B2 8/2014 Benedek et al.
8,813,972 B1 8/2014 Centers
8,882,955 B2 11/2014 Brandon et al.
9,061,289 B2 6/2015 Gitschel
9,545,650 B2 1/2017 Wang et al.
9,649,666 B2 5/2017 Gitschel
9,713,812 B1 7/2017 Gitschel
9,884,324 B2 2/2018 Gitschel
9,913,429 B1 3/2018 Stubbs et al.
9,945,608 B2 4/2018 Ploeger et al.
10,021,859 B1 7/2018 Miller
10,311,394 B2 6/2019 Miller et al.
10,377,518 B2 8/2019 Waite et al.
10,438,281 B2 10/2019 Walsh et al.
10,464,105 B2 11/2019 Koistinen et al.
10,535,022 B1 1/2020 Hood et al.
10,564,029 B2 2/2020 Waite et al.
10,661,984 B2 5/2020 Chan et al.
10,678,272 B2 6/2020 Lattanzio et al.
10,793,377 B2 10/2020 Martin et al.
10,799,915 B2 10/2020 Horowitz et al.
10,835,927 B2 11/2020 Torriere
10,853,353 B2 12/2020 Balaraman et al.
10,864,555 B2 12/2020 Mccoy, Jr. et al.
10,984,394 B2 4/2021 Collins et al.
11,059,075 B2 7/2021 Mccoy, Jr. et al.
11,069,053 B2 7/2021 Horowitz et al.
11,117,169 B2 9/2021 Torriere
11,123,939 B2 9/2021 Chan et al.
11,148,383 B2 10/2021 Waite et al.
11,162,834 B2 11/2021 Waite et al.
11,241,854 B2 2/2022 Waite et al.
11,327,957 B2 5/2022 Su et al.
11,481,257 B2 10/2022 Sharma et al.
11,508,021 B2 11/2022 Hovhannisyan et al.
11,571,869 B2 2/2023 Chan et al.
11,651,334 B1 5/2023 Megyese et al.
11,673,703 B1 6/2023 Gaydos et al.
11,693,705 B2 7/2023 Sharma et al.
11,707,747 B1 7/2023 Torriere
11,717,857 B2 8/2023 Torriere
11,734,074 B2 8/2023 Sharma et al.
11,776,670 B1 10/2023 Walk et al.
11,780,190 B2 10/2023 Chan et al.
11,850,761 B2 12/2023 Peterson et al.
11,850,818 B2 12/2023 Chan et al.
11,875,296 B2 1/2024 Benjamin et al.
12,044,470 B2 7/2024 Christensen et al.
12,070,921 B1 8/2024 Drier et al.
12,077,257 B2 9/2024 Maydanik
12,103,045 B2 10/2024 Kumar et al.
12,138,883 B2 11/2024 Chan et al.
12,139,293 B1 11/2024 Gaydos et al.
12,269,233 B2 4/2025 Chan et al.
12,440,852 B1 10/2025 Torriere
12,485,536 B2 12/2025 Byars et al.
12,496,618 B2 12/2025 Filler et al.
12,505,530 B2 12/2025 Lamb et al.
2002/0020175 A1 2/2002 Street et al.
2002/0108507 A1 8/2002 May et al.
2003/0028289 A1 2/2003 Daniel et al.
2003/0053906 A1 3/2003 Itou et al.
2003/0183705 A1 10/2003 Christiani et al.
2005/0015287 A1 1/2005 Beaver
2005/0065640 A1 3/2005 Mallett et al.
2005/0126958 A1 6/2005 Bohlig et al.
2005/0183990 A1 8/2005 Corbett, Jr.
2005/0197175 A1 9/2005 Anderson
2005/0209905 A2 9/2005 Ness et al.
2005/0242006 A1 11/2005 Bohlig et al.
2005/0280537 A1 12/2005 Feltz et al.
2006/0080819 A1 4/2006 Mcallister
2006/0254957 A1 11/2006 Bohlig et al.
2007/0102109 A1 5/2007 Katritzky et al.
2007/0209530 A1 9/2007 Viaud
2008/0041982 A1 2/2008 Paulson et al.
2008/0141714 A1 6/2008 Cartwright et al.

(56) References Cited

U.S. PATENT DOCUMENTS

2008/0197058 A1 8/2008 Kenny
2008/0197194 A1 8/2008 Flood
2009/0008298 A1 1/2009 Studley
2009/0281677 A1 11/2009 Botich et al.
2010/0011717 A1 1/2010 Rivard
2010/0116881 A1 5/2010 Flood et al.
2010/0145629 A1 6/2010 Botich et al.
2010/0228601 A1 9/2010 Vaswani et al.
2010/0235209 A1 9/2010 Vaswani et al.
2010/0299097 A1 11/2010 Threlkeld et al.
2011/0071867 A1 3/2011 Chen et al.
2012/0004938 A1 1/2012 Beaver
2012/0029980 A1 2/2012 Paz
2012/0048129 A1 3/2012 Smith et al.
2012/0168354 A1 7/2012 Sundholm
2012/0199519 A1 8/2012 Ward
2012/0204740 A1 8/2012 Bergmann
2012/0217328 A1 8/2012 Bohlig et al.
2012/0266763 A1 10/2012 Foster et al.
2013/0008324 A1 1/2013 Verhaeghe et al.
2013/0132233 A1 5/2013 Rothley et al.
2013/0290511 A1 10/2013 Tu et al.
2014/0012553 A1 1/2014 Kelly et al.
2014/0156541 A1 6/2014 Waite et al.
2014/0157999 A1 6/2014 Verhaeghe et al.
2014/0214220 A1 7/2014 Kamel et al.
2014/0222665 A1 8/2014 Kamel et al.
2014/0236680 A1 8/2014 Chen et al.
2014/0303935 A1 10/2014 Kamel et al.
2014/0337107 A1 11/2014 Foster
2015/0199846 A1 7/2015 Sanderson et al.
2015/0204591 A1 7/2015 Burg et al.
2015/0283551 A1 10/2015 Gitschel
2015/0379785 A1 12/2015 Brown, Jr. et al.
2016/0014965 A1 1/2016 Naeyaert et al.
2016/0023417 A1 1/2016 Hanson et al.
2016/0081276 A1 3/2016 Riesterer et al.
2016/0088798 A1 3/2016 Lang et al.
2016/0166980 A1 6/2016 Pan et al.
2016/0187185 A1 6/2016 Smith
2016/0203146 A1 7/2016 Moll et al.
2016/0339445 A1 11/2016 Robinson
2017/0008671 A1 1/2017 Whitman et al.
2017/0011362 A1 1/2017 Whitman et al.
2017/0014868 A1 1/2017 Garcia, Jr. et al.
2017/0178066 A1* 6/2017 High ...................... E01H 5/061
2017/0200135 A1 7/2017 Whitman et al.
2017/0202150 A1 7/2017 Smith
2017/0211969 A1 7/2017 Waite et al.
2017/0225199 A1 8/2017 Koistinen et al.
2017/0226439 A1 8/2017 Nguyen et al.
2017/0283292 A1 10/2017 Kim
2018/0037830 A1 2/2018 Bohlig et al.
2018/0056617 A1 3/2018 Chan et al.
2018/0056618 A1 3/2018 Chan et al.
2018/0057259 A1 3/2018 Chan et al.
2018/0112142 A1 4/2018 Foody et al.
2018/0229273 A1 8/2018 Carvajo Lucena et al.
2018/0268379 A1 9/2018 Collins et al.
2018/0364093 A1 12/2018 Vasconcelos et al.
2019/0030571 A1 1/2019 Horowitz et al.
2019/0039772 A1 2/2019 Le
2019/0039837 A1 2/2019 Zhou et al.
2019/0084012 A1 3/2019 Mccoy, Jr. et al.
2019/0130560 A1 5/2019 Horowitz et al.
2019/0148797 A1 5/2019 Paszti
2019/0217342 A1 7/2019 Parr et al.
2019/0224617 A1 7/2019 Mitariten
2019/0224935 A1 7/2019 Waite et al.
2019/0249666 A1 8/2019 Lindberg et al.
2019/0293478 A1 9/2019 Waite et al.
2019/0304236 A1 10/2019 Chan et al.
2020/0010271 A1 1/2020 Bourn et al.
2020/0031513 A1 1/2020 Beach
2020/0048015 A1 2/2020 Martin et al.
2020/0087118 A1 3/2020 Sato et al.
2020/0129989 A1 4/2020 Schultz
2020/0164608 A1 5/2020 Waite et al.
2020/0171547 A1 6/2020 Torriere
2020/0197981 A1* 6/2020 Neige ..................... G01J 3/108
2020/0222949 A1 7/2020 Murad et al.
2020/0338753 A1 10/2020 Schultz et al.
2020/0338758 A1 10/2020 Schultz et al.
2021/0012254 A1 1/2021 Campbell et al.
2021/0046513 A1 2/2021 Mccoy, Jr. et al.
2021/0060618 A1 3/2021 Torriere
2021/0086999 A1 3/2021 Martin et al.
2021/0094075 A1 4/2021 Horowitz et al.
2021/0094894 A1 4/2021 Whitmore
2021/0170707 A1 6/2021 Chan et al.
2021/0179366 A1 6/2021 Mccoy, Jr. et al.
2021/0206586 A1 7/2021 Douglas et al.
2021/0206588 A1 7/2021 Douglas et al.
2021/0217156 A1 7/2021 Balachandran et al.
2021/0290177 A1 9/2021 Novak, Jr. et al.
2021/0296008 A1 9/2021 Novak, Jr. et al.
2021/0327187 A1 10/2021 Wisniewski
2021/0328801 A1 10/2021 Sly et al.
2021/0335074 A1 10/2021 Cowles et al.
2021/0335458 A1 10/2021 Mcmullen
2021/0338102 A1 11/2021 Palacios et al.
2021/0375084 A1 12/2021 Aubrey et al.
2021/0402439 A1 12/2021 Torriere
2022/0027810 A1 1/2022 Murthy et al.
2022/0055071 A1 2/2022 Sharma et al.
2022/0108252 A1 4/2022 Narasimhan et al.
2022/0168898 A1 6/2022 Satat
2022/0180501 A1 6/2022 Perez
2022/0184855 A1 6/2022 Mleczko et al.
2022/0214273 A1* 7/2022 Vandeputte .......... G01N 21/359
2022/0230251 A1 7/2022 Kawamori et al.
2022/0274895 A1 9/2022 Mcconell
2022/0327538 A1 10/2022 Kumar et al.
2022/0343433 A1 10/2022 Yan et al.
2023/0061787 A1 3/2023 Feickert et al.
2023/0061958 A1 3/2023 Al Hosani et al.
2023/0120932 A1 4/2023 Parr et al.
2023/0144877 A1 5/2023 Soundarrajan et al.
2023/0173543 A1 6/2023 Kumar et al.
2023/0286239 A1 9/2023 Chan et al.
2023/0305565 A1 9/2023 Morris
2023/0312273 A1 10/2023 Teichrob et al.
2023/0381824 A1 11/2023 Dadlani
2023/0394495 A1 12/2023 Abdelsamic
2024/0034019 A1 2/2024 Chan et al.
2024/0037471 A1 2/2024 Jones et al.
2024/0059858 A1 2/2024 Huber et al.
2024/0075702 A1 3/2024 Chan et al.
2024/0085102 A1 3/2024 Christensen et al.
2024/0100567 A1 3/2024 Mckiver
2024/0183609 A1 6/2024 Christensen et al.
2024/0198390 A1 6/2024 Parr et al.
2024/0281713 A1 8/2024 Gupta et al.
2024/0338655 A1 10/2024 Vandeputte
2024/0417891 A1 12/2024 Yip et al.
2025/0018401 A1 1/2025 Torriere et al.
2025/0108408 A1* 4/2025 Potter .................... G01N 31/00
2025/0135497 A1 5/2025 Chevrette et al.
2025/0166353 A1 5/2025 Luce et al.
2026/0048529 A1 2/2026 Chevrette et al.

FOREIGN PATENT DOCUMENTS

CN 204494897 U 7/2015
CN 206796893 12/2017
CN 107697380 2/2018
CN 108643104 10/2018
CN 109178728 1/2019
CN 110717368 A 1/2020
CN 112502953 3/2021
CN 113998335 A 2/2022
CN 115111673 A 9/2022
CN 116967155 A 10/2023
DE 10006740 A1 8/2001

(56) References Cited

FOREIGN PATENT DOCUMENTS

| | | | |
|---|---|---|---|
| EP | 0557816 | A2 | 9/1993 |
| EP | 4272136 | | 11/2023 |
| GB | 2488996 | | 9/2012 |
| JP | 3145885 | U | 10/2008 |
| KR | 102865415 | B1 | 9/2025 |
| WO | 1999/037474 | | 7/1999 |
| WO | 03/031167 | | 4/2003 |
| WO | 2004/012866 | | 2/2004 |
| WO | 2018/044496 | A1 | 3/2018 |
| WO | 2018/057126 | | 3/2018 |
| WO | 2018/044498 | | 8/2018 |
| WO | 2019/195257 | | 10/2019 |
| WO | 2021/207240 | | 10/2021 |
| WO | 2022/146427 | | 7/2022 |
| WO | 2022/190230 | A1 | 9/2022 |
| WO | 2023/001935 | A1 | 1/2023 |
| WO | 2024/009118 | A1 | 1/2024 |
| WO | 2024/054552 | | 3/2024 |
| WO | 2026/039767 | A1 | 2/2026 |

OTHER PUBLICATIONS

Spyridis, Yannis et al.; Textile Analysis for Recycling Automation using Transfer Learning and Zero-Shot Foundation Models; Jun. 6, 2025; 7 pages.

Ullal, Mithun S., et al.; AI-enabled robotic sorting for circular textile waste management: A scalable solution for India's recycling sector; Nov. 1, 2025; pp. 876-882.

Access Protocols for All State Offices and Facilities; Nov. 18, 2020; https://dbm.maryland.gov/employees/documents/covid-19%20building%20entry%20protocol.pdf; 2 pages.

Canadian Intellectual Property Office; Examiner Report, issued in connection to application No. 3,035,602; Sep. 29, 2023; 4 pages; Canada.

Canadian Intellectual Property Office; Office Action, issued in connection to application No. 3,063,184; Mar. 28, 2025; 4 pages; Canada.

Canadian Intellectual Property Office; Office Action, issued in connection to application No. 3035600, Mar. 13, 2024; 3 pages; Canada.

Canadian Intellectual Property Office; Office Action, issued in connection to application No. 3035601; Feb. 29, 2024; 3 pages; Canada.

Canadian Intellectual Property Office; Office Action, issued in connection to application No. 3095894; Jul. 31, 2025; 8 pages; Canada.

Canadian Intellectual Property Office; Office Action, issued in connection to patent application No. 3035600; Mar. 13, 2024; 3 pages; Canada.

Couling, Tom; Recovering Recyclables Through Mixed Waste Processing; Public Works 124.n2:p53; Hanley-Wood, Inc.; Feb. 1993; 3 pages.

Crowdblink, Employee Health Screening App: Daily Covid-19 Assessments, Nov. 19, 2021.

Ecohedge; Carbon Accounting Software: Streamline Your Sustainability Efforts; EcoHedge Ltd.; Jan. 8, 2024; 20 pages.

European Patent Office; PCT International Search Report, issued in connection to application No. PCT/US2023/032164; 7 pages; Apr. 9, 2024; Europe.

European Patent Office; PCT International Search Report, Issued in connection to PCT/US2025/042232; Dec. 16, 2025; 5 pages; Europe.

European Patent Office; PCT Written Opinion of the International Searching Authority, issued in connection to application No. PCT/US2023/032164; 13 pages; Apr. 9, 2024; Europe.

European Patent Office; PCT Written Opinion of the International Searching Authority, Issued in connection to PCT/US2025/042232; Dec. 16, 2025; 9 pages; Europe.

Goevo, Return to work safely and quickly with the Personal Protective App (PPA), Dec. 31, 2021.

Graniefuel Engineering; Alliance Dairies' RNG Plant; 2023; 4 pages.

Higley, Card Access Data Integration and Reporting During COVID-19, Aug. 31, 2020.

International Search Report and Written Opinion, issued in connection to application No. PCT/US2017/045315, Oct. 30, 2017.

Kareem, Shefy Manayil; Introducing new ESG data and reporting capabilities in Microsoft Cloud for Sustainability; Jun. 15, 2023; 11 pages.

Kat, Jeff; Research Targets Sorting Robots and Separating Chemicals to Improve Plastic Recycling; https://www.forbes.com/sites/jeffkart/2021/01/15/research-targets-sorting-robots-and-separating-chemicals-to-improve-plastic-recycling/?sh=46705ab53fd1; Jan. 15, 2021; 4 pages.

Konstantinidis, Fotiios K. et al.; Multi-sensor cyber-physical sorting system (CPSS) based on Industry 4.0 principles: A multi-functional approach; Elsevier B.V.; 2022.

Lawton, George; 18 Sustainability Management Software Providers to Consider; Apr. 11, 2023; 10 pages.

Mathai, George et al.; HartEnergy: Controlling Reciprocating Compressors; Jul. 1, 2008; 10 pages.

Mexican Institute of Industrial Property; Office Action, issued in connection to application No. MX/a/2019/002485; 4 pages; Aug. 25, 2023; Mexico.

Mexican Institute of Industrial Property; Office Action, issued in connection to application No. MX/a/2019/002485; 4 pages; Nov. 27, 2019; Mexico.

Mexican Institute of Industrial Property; Office Action, issued in connection to application No. MX/a/2019/002485; 5 pages; Apr. 30, 2019; Mexico.

Mexican Institute of Industrial Property; Office Action, issued in connection to application No. MX/a/2019/002485; 5 pages; Feb. 16, 2024; Mexico.

Microsoft, Use the Employee Return to the Workplace app, Aug. 3, 2021.

Perennial Energy; Biogas Processing Systems; 2015; 2 pages.

Public Works; Refuse Processing and Resource Recovery; Public Works 125 n5: pE22; Hanley-Wood, Inc.; Apr. 15, 1994; 18 pages.

Returnsafe, Health Screening Prior to Entering the Workplace, Nov. 19, 2021.

Ryerson, Introducing RyersonSafe for health screening process for all students, faculty, staff, visitor, Jul. 12, 2021.

Schneider, Robert J. et al.; Multilevel MRF Solves Solid Waste Challenges; BioCycle 34.5: 62.J.G.; Press Inc.; May 1993; 4 pages.

Servicenow, Configure Employee Health Screening, Dec. 31, 2021.

The International Bureau of WIPO; PCT International Preliminary Report on Patentability, issued in connection to application No. PCT/US2017/045294; Mar. 5, 2019; 7 pages; Switzerland.

The International Bureau of WIPO; PCT International Preliminary Report on Patentability, issued in connection to application No. PCT/US2023/032164; Mar. 20, 2025; 13 pages; Switzerland.

The International Bureau of WIPO; PCT International Preliminary Report on Patentability, issued in connection to application PCT/US2017/045278; Mar. 5, 2019; 9 pages; Switzerland.

The International Bureau of WIPO; PCT International Preliminary Report on Patentability, issued in connection with application No. PCT/US2019/025345; 8 pages; Switzerland.

Toto, Deanne; Amp Robotics Introduces Material Characterization Software; https://www.wastetodaymagazine.com/article/amp-material-characterization-software-mf-operations/; Apr. 27, 2021; 11 pages.

U.S. Patent and Trademark Office; PCT International Search Report, issued in connection to application No. PCT/US2017/045294; Oct. 10, 2017; 2 pages; US.

U.S. Patent and Trademark Office; PCT Written Opinion of the International Searching Authority, issued in connection to application No. PCT/US2017/045294; Oct. 10, 2017; 6 pages; US.

United States Patent and Trademark Office; PCT International Search Report, issued in connection to application PCT/US2017/045278; Nov. 2, 2017; 3 pages; US.

United States Patent and Trademark Office; PCT International Search Report, issued in connection with application No. PCT/US2019/025345; Jul. 22, 2019; 4 pages; US.

(56) References Cited

OTHER PUBLICATIONS

United States Patent and Trademark Office; PCT Written Opinion of the International Searching Authority, issued in connection to application PCT/US2017/045278; Nov. 2, 2017; 8 pages; US.
United States Patent and Trademark Office; PCT Written Opinion of the International Searching Authority, issued in connection with application No. PCT/US2019/025345; Jul. 22, 2019; 7 pages; US.
USCF, Daily Health Screening, Nov. 19, 2021; 3 pages.
Vmware, Employee Experience When They Receive a Health Attestation Notification in Workspace ONE Intelligent Hub App, Sep. 1, 2021.
Waste Management, Inc. et al.; Waste Management—Customer Communications; Te Ohio State University; 1 page; Apr. 14, 2019; U.S.
Waste Management: Customer Communication; Autumn 2018, Engineering 5901.01 Multidisciplinary Design Capstone; 265 pages; Dec. 7, 2018; U.S.
Wissenschaftszentrum Nordrhein-Westfalen; Analysis and Evaluation of the Possible Uses of Biomass; Aug. 1, 2005; http://www.biogaseinspeisung.de/download/Endberichet-Band3_FhG-IUSE.pdf; 236 pages; Germany.
Young, Ben et al.; A System for Standardizing and Combining U.S. Environmental Protection Agency Emissions and Waste Inventory Data; Applied Sciences; Mar. 28, 2022; 16 pages.
Humpston, Giles et al.; Identification of Fibre Composition of Apparel for Recycling; Dec. 31, 2015; 15 pages.
Perez, Maria Marin; Analysis of European post-consumer textile waste for automated sorting; Dec. 31, 2021; 40 pages.
Riba, Jordi-Roger et al.; Post-Consumer Textile Waste Classification through Near-Infrared Spectroscopy, Using an Advanced Deep Learning Approach; Polymers; Jun. 17, 2022; 14 pages.
Spyridis, Yannis et al., Autonomous Al-enabled Industrial Sorting Pipeline for Advanced Textile Recycling; Apr. 29, 2024; 7 pages.

* cited by examiner

SYSTEM AND METHOD FOR SEPARATION AND SORTING OF POST-CONSUMER TEXTILES

RELATED APPLICATIONS

This application claims the benefit, and priority benefit, of U.S. Provisional Patent Application Ser. No. 63/746,633, filed Jan. 17, 2025, the disclosure and contents of which are incorporated by reference herein in its entirety.

FIELD OF THE INVENTION

The presently disclosed subject matter relates generally to sorting and separation of textiles.

BACKGROUND

Significant amounts of post-consumer textile waste are generated every year. While many of the rewearable textiles are sold in the second-hand market, many rewearable and non-rewearable textiles are currently being downcycled, incinerated or landfilled.

Sorting technology may be used to perform separation of post-consumer textiles for recycling or reuse. However, even sorting facilities having some automated processes may be limited in the range of attributes considered for recycling or reused which results in many textiles being incinerated or landfilled.

Improvements in this field of technology are desired.

SUMMARY

In some examples, a system for sorting post-consumer textiles may include a conveyor subsystem configured to convey a garment from an infeed stage to one of a plurality of bunkers; a first subsystem configured to receive the garment, with an optical sensor, a first memory, and a first processor configured to cause light to be emitted toward the garment, receive reflected light from the garment, determine a predictive material composition based on a spectral signature corresponding to a change between the reflected light and the emitted light, and identify a first sorting bunker based on the predictive material composition; and a second subsystem configured to receive the garment, with a digital tag reader, a second memory, and a second processor configured to cause the digital tag reader to read a digital tag coupled to the garment, receive data associated with the garment, retrieve a material composition from the data, and, when the material composition and predictive material composition differ, reassign the garment to a second sorting bunker.

In some examples, the emitted light may be within a near-infrared wavelength range, the optical sensor may be a near-infrared sensor configured to receive reflected near-infrared light, and the digital tag reader may be a radio frequency reader configured to read a radio frequency identifier tag.

In some examples, a system may include a third subsystem with a visible light camera, a third memory allocation, and a third processor allocation configured to receive an image of the garment, identify a region with a particular logo, retrieve a plurality of logos from a first database and associate the logo with a brand logo, retrieve from a second database a circularity policy associated with the brand, and assign a particular bunker to the clothing item based on the circularity policy.

In some examples, the third processor allocation may be configured to identify a garment type based on one or more visual parameters, retrieve an estimated garment price for a similar garment from a resale database based on the visual parameters, the garment type, and the logo, and update a data entry for the garment including the garment type, the material composition, and the estimated garment price.

In some examples, a system may include a metal detector subsystem with a metal detector configured to detect a metal material coupled to the clothing item.

In some examples, the metal material is a non-ferrous metal material. In some examples, the infeed stage may include a robotic arm configured to suspend the garment with respect to the conveyor subsystem and an infeed camera configured to capture one or more visual features of the garment.

In some examples, a system for sorting post-consumer textiles may include a plurality of subsystems with a first subsystem having an optical detector and a garment picker configured to receive a textile stream including a first garment and a second garment, identify an origin of the first garment based on a first visual parameter, cause the garment picker to retrieve the first garment, scan the second garment, and, when a second visual parameter fails a selection criteria, convey the second garment to a second subsystem; and the second subsystem may include a fiber scanner configured to receive the second garment, determine a fiber composition of the second garment, and select a sorting bunker for the second garment based on the fiber composition.

In some examples, identifying the origin of the garment may include identifying a brand logo associated with the garment. In some examples, a system may include a third subsystem with a metal detector configured to receive the second garment from the second subsystem and detect a metal material coupled to the second garment.

In some examples, a system may include a fourth subsystem with a camera configured to capture an image of the second garment, identify from the image a color pattern including a hue and a color, retrieve from a web server a reference image of the second garment in a new condition, determine a difference in hue and color between pixels of the captured image and pixels of the reference image, and determine a garment condition based on the difference.

In some examples, when the garment condition for the second garment corresponds to at least a like new condition, a robotic arm may extract the second garment from the fourth subsystem. In some examples, the fiber scanner may be a near-infrared sensor configured to capture reflected light from the garments. In some examples, a system may include a third subsystem configured to read a digital tag associated with a garment of the textile stream.

In some examples, a system of sorting post-consumer textiles may include a robotic arm assembly configured to manipulate a position of a garment, a camera configured to capture a substantial portion of a front and a back of the garment, a conveyor belt configured to convey garments, a memory allocation, and a processor allocation configured to receive a garment image, identify a plurality of visual parameters via a predictive model, determine a classification of the garment based on the visual parameters, and, when the classification satisfies a selection criteria, cause removal of the garment from the conveyor belt.

In some examples, the system may include a near-infrared sensor configured to receive reflected near-infrared light, a metal detector configured to detect a metal material, and a digital tag reader, and the processor allocation may be configured to determine a fiber composition of the garment from the near-infrared sensor, identify hardware coupled to the garment comprising a metal material based on the metal detector, retrieve digital tag data based on a reading of a digital tag coupled to the garment, and generate a data entry including the fiber composition, data associated with the hardware, and the digital tag data.

In some examples, the processor allocation may be configured to assign a corresponding weight to the fiber composition, the data associated with the hardware, and the digital tag data, generate a circularity metric based on the weights, and update destination instructions for the garment based on the circularity metric.

In some examples, a system may include a separation stage with a plurality of pneumatic assemblies configured to blow air at select garments to move the garments away from the conveyor belt, and a sorting stage beneath the separation stage configured to receive the select garments. In some examples, the predictive model may be a convolutional neural network. In some examples, the plurality of visual parameters may include a color, a texture, a logo, and a shape.

BRIEF DESCRIPTION OF THE DRAWINGS

The disclosure will be readily understood by the detailed description and by the accompanying drawings.

Figure 1:
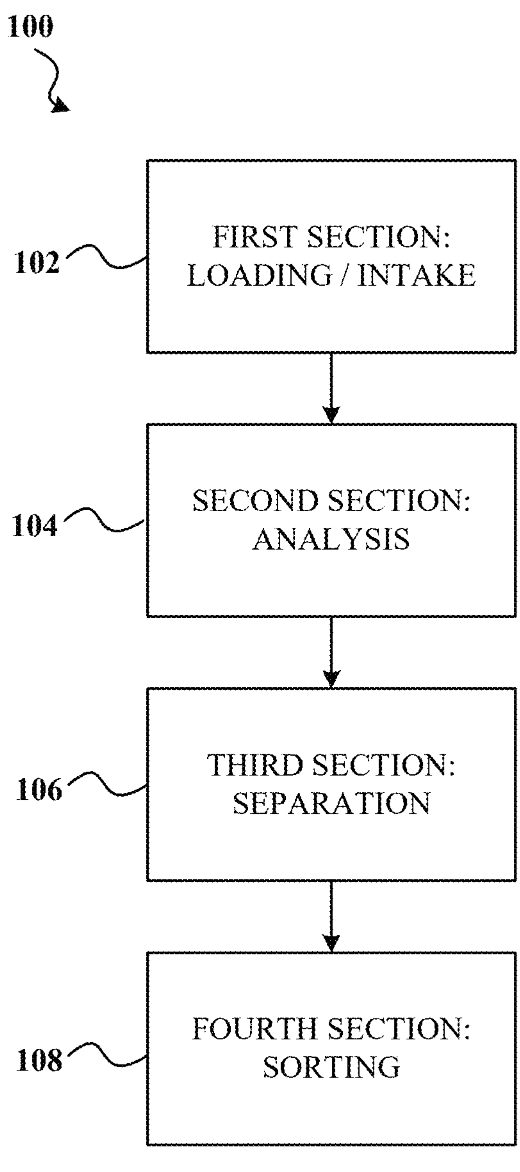
FIG. 1 shows a simplified diagram of a textile sorting system, such as described herein.

It should be understood that the proportions, dimensions, groupings, boundaries, or positional relationships between items are provided for facilitating an understanding of the disclosure and are not intended to indicate a preference or intended to be limiting.

DETAILED DESCRIPTION

In accordance with the presently disclosed subject matter, various illustrative embodiments of an improved system and method for sorting and separation of post-consumer textiles within industrial process facilities are described herein.

The system may include multiple subsystems having different types of sensors that detect, define, and/or determine different attributes associated with a clothing item while the clothing item is passing through the system. Based on the detected attributes, a comprehensive attribute profile for the clothing item is generated. Each data attribute associated with the clothing item may be used by a predictive model to generate a sorting decision for the clothing item. The decision may be based on a dynamic priority criteria. In some embodiments, as the clothing item exits a first subsystem, a sorting decision is made based on a particular attribute derived from the first subsystem. In some cases, a subsequent subsystem may be configured to override a prior sorting decision from the first subsystem based on different data for the particular attribute generated by the subsequent subsystem. In some cases, a sorting decision may be based on external data from a plurality of manufacturers, a plurality of e-commerce sites, and/or a plurality of textile circularity facilities.

More generally, the system may include an infeed section, an analysis section, a separation section, and a sorting section. The system may be configured to receive a textile stream via a conveyor system that conveys the textiles (e.g., including the clothing item) to the different sections. The analysis section may include optical sensors, such as visible light cameras, near-infrared (NIR) light image sensors, and/or hyperspectral imaging sensors; metal detectors; and digital tag readers.

Each of these sensors may be able to extract and/or generate data on the clothing item and, based on the data, the system may be configured to decide where the clothing item is directed to. As a non-limiting example, the dynamic priority criteria may be based on a circularity potential of the clothing item, such as an end-market where the clothing item is most likely to be reused and less likely to end up in a landfill.

For example, particular learning models may be configured to receive an image of a clothing item and determine that the clothing item has a brand logo attached or printed thereto. Based on the detected logo associated with the clothing item, the system may be configured to retrieve and associate the logo with a particular brand. Data on the brand may, in turn, be used by one or more predictive models, generative models, or agents to determine an origin of the clothing item (e.g., country of origin, country of sale) may be assessed. Additionally, the system may be configured to retrieve a sales price of the item (e.g., when new) based on the logo, shape, color, and other attributes of the item. In some examples, the system may be configured to retrieve a resale value of the item. In some examples, the system may be configured to determine a condition of the item based on a change in hue, color, texture, or similar, which may indicate wear and fading of the fabric and retrieve a resale value of the item based on a similarly-worn item. In some cases, the system may be configured to determine a brand's circularity potential (e.g., recyclability, reusability, or potential for upcycling) for the item and, based on the brand's policy and assign the clothing items for returning to the original manufacturer. Due to the multi-attribute approach for classifying each clothing item, which provides a higher level of granularity for sorting decisions by the system, the system described herein is intended to reduce the amount of textiles that are incinerated or landfilled.

Unlike some sorting facilities which rely on a monolithic criteria to make sorting decisions, the systems and methods described herein may leverage different criteria selected dynamically based on external information, thereby providing higher flexibility to end markets.

As described herein, a textile sorting system and method of sorting textiles may be configured to sort textiles using a plurality of sorting subsystems to increase the percentage of textiles recycled. In some non-limiting embodiments, the sorting subsystems may employ machine learning modules, artificial intelligence (AI), digital product passports, and market data to sort for a wider array of end markets. Methods described herein may include an operation of sequencing data such as market value, brand, season, quality index, carbon footprint of end market, and other objective and subjective attributes to determine the optimal end market that optimizes economic and environmental value of the item. The sequencing of the data may be performed via data crawlers, web-intelligent semantic extractors, and other large-language model (LLM)-powered crawlers. In some examples, the sequencing may be performed using AI-powered crawlers that identify web addresses from textile secondhand end markets (e.g., such as brands, manufacturers, resellers, thrift stores, recycling textile enterprises) and perform semantic processing to extract textile recycling, upcycling, or reuse policies. Each of these policies may be structured to generate a textile recycling registry. Additionally, the AI-powered crawler may extract multimodal content, such as images, video, and audio, and store structured data in the registry. Based on the data, a supervised learning model may be configured to analyze the data and generate circularity scores for each of the end-markets. In some examples, the learning model may generate a dynamic priority criteria, which allows items to be classified based on a plurality of criteria, such as textile composition, resale market value, circularity potential, manufacturer commitment scores, and the like, and select a sorting bunker (which may correspond to an end bunker).

As an example application, a particular clothing item passing through the system may have a particular attribute profile generated from data extracted from the various subsystems along the textile sorting facility. Based on the attribute profile, the clothing item may be eligible to be sent to a cotton upcycling facility, to be sent back to the original manufacturer based on the manufacturer's take back policies, to be resold on an e-commerce secondhand platform at a predetermined value, or to be downcycled for creating shop rags. Based on these options, a machine learning model or a deep learning model may be configured to decide a sorting bunker to assign the particular clothing item and, therefore, which end market to send the particular clothing item to. In some examples, the model may decide the end market based on a rule-based priority matrix (for example, a manufacturer's take back program may be prioritized over downcycling programs). In other examples, the priority matrix may change according to prior assignments and feedback data. For example, in some cases a certain manufacturer's take back policies may favor returning the item to an original manufacturer. However, in some cases, the original manufacturer may be in another country where shipment results in a larger carbon footprint than a local resale. In this example, a secondhand e-commerce platform may be selected and the particular clothing item may be sorted accordingly. These examples are provided for illustrative purposes and are not intended to be limiting.

In some cases, the system may include data and equipment that can be leveraged to sort material by brand. Many brands and retailers are seeking solutions to manage post-consumer apparel in a manner that allows them to receive the apparel back from the consumer at end of use. This enables them to evaluate the apparel for additional opportunities related to repair, resale, or support of their preferred supply chain partners such as emerging fiber recyclers or charities. The presently disclosed system and method can be used to supply these sorted materials streams.

FIG. 1 shows a schematic overview of a system 100 for sorting and separation of textiles within industrial process facilities, such as described herein. The system can include four (4) sections.

A first section 102 is a loading section where textile materials are loaded for separation. Mixed apparel materials (clothing-based) can be loaded or dumped onto a conveyor belt for transport, either by human workers or via robotic machinery. In some examples, the first section may include robotic arms and cameras. The robotic arms may be configured to pick up a clothing item from the conveyor belt or from the infeed pile. As the robotic arm suspends the clothing item, the camera(s) may be configured to scan the clothing item, such as by taking images or videos of the clothing item. In some examples, the scan be may a 360-degree scan of the item. The scan may be used by a predictive model to extract a brand, a style, a vintage, a garment type, and other visual features such as rips, stains, tears, and the like.

In some examples, the scan may be configured to extract, from the infeed system, clothing items that have a low likelihood of being able to be recycled, upcycled, re-used, re-purposed, or otherwise be able to remain part of the circularity cycle.

In response to extracting a plurality of attributes from the scan, a respective data entry associated with the clothing item may be generated. In non-limiting examples, data on the scan may be received by downstream subsystems to further evaluate an initial assessment from the scan, to override at least one attribute from the assessment, and/or to otherwise add additional attributes associated with the clothing item. The generated attributes may form a clothing item profile that may be leveraged by one or more predictive models to assess an end-location of the clothing item, such as a particular sorting bin.

In non-limiting examples, the first section 102 may include one or more gates, feeders (e.g., vibrating feeders, screw feeders, rotating feeders), and/or diverters configured to control a volume and/or weight of the mixed apparel materials into the conveyor belt. For example, the volume and/or weight regulating systems may be configured to distribute each piece of apparel such to reduce overlap with respect to the conveyor belt. In some non-limiting examples, the volume and/or weight regulating systems may be configured to distribute the mixed apparel material such that the textiles are unlikely to fall or roll off the conveyor belt in preparation for subsequent analysis and/or sorting sections.

In some cases, the first section 102 may include a plurality of pickers configured to pick up and/or manipulate the clothing item. The plurality of pickers may be human-operated or operated based on vision models. Based on the origin and age of the item, the plurality of pickers are configured to arrange certain clothing items such that a manufacturer's tag is visible to downstream subsystems in the second section. In some cases, the first section 102 may be configured to detect whether the clothing item has a digital tag available and, if not, a tag identification operation is performed.

In some cases, the first section 102 may include a plurality of sensors configured to detect a weight, a volume, density, or other mass or volumetric-based metrics to automatically adjust one or more system intake assemblies. For example, in response to a volume of mixed apparel materials exceeding a criteria, a speed of a conveyor belt may be adjusted. In other non-limiting examples, the robotic machinery, including feeders, may be configured to control a rate of material input at a predetermined conveyor belt speed.

A second section 104 is an analysis section (also referred to herein as an analysis stage). For example, a variety of sensors having different types of functionalities can be positioned over or near the conveyor belt to scan textile samples as they pass along on the conveyor and identify the materials in the textile samples.

The second section 104 may include a plurality of subsystems configured to determine particular attributes associated with each item of clothing. Each of the subsystems may be arranged in series, in parallel, and/or perpendicular with respect to each other subsystem. In some cases, particular subsystems may be physically elevated (e.g., at an elevated conveyor) with respect to other subsystems. The plurality of subsystems may be communicably coupled (e.g., at a central server or a central hub) such that data for a particular clothing item generated by a first subsystem may be used in an assessment of an attribute of the particular clothing item by another subsystem different from the first subsystem. Additionally or alternatively, an assessment of a clothing item by a downstream subsystem may override an assessment of the same clothing item by an upstream subsystem.

In some examples, an output from the analysis section may include an identification of the clothing item. The identification may include a location indicator of the item (e.g., such as relative position, time to arrival of a third section, location within the conveyor belt, or other position reference metric), and separation instructions. For example, separation instructions may include specific bins or destinations where the clothing item should be routed to. In other examples, the separation instructions may include separating the item for human verification, sending the item to other recycling or waste facilities, or the like.

In non-limiting embodiments, the second section 104 may be configured to select clothing items according to most economic worth or highest priority in the sorting allocation engine to determine which cart or bunker the clothing item is going to get sorted into. Specifically, the system 100 may be configured to retrieve external data structured in a data registry. The data registry may include data from a plurality of manufacturer's take back or buy-back policies, data from a plurality of secondhand e-commerce platforms, and data from a plurality of textile recycling facilities. In some examples, the data may be structured according to particular items, particular item categories, or similar. The system 100 is configured to retrieve external data associated with the particular item and determine, for instance, if the manufacturer of the item accepts pre-used items, the average value of the item for a similar vintage of the item, or a value of the fabric. Each potential sorting end-market may be weighed according to a criteria and a sorting bunker is selected.

In non-limiting embodiments, for each clothing item scanned (e.g., at the second section), a data entry associated with the clothing item may be generated. The data entry may include a color, a brand, fiber content percentage, retail value, sale value, or condition of the clothing item. In some examples, each or the combination of attributes may be analyzed to generate a sorting assessment and/or a recyclability assessment.

A third section 106 may a separation section. In non-limiting examples, a ballistic separator can be programmed to blow pneumatic air into the materials stream and separate the materials based on the identifications made in the second section. More specifically, an automated separator may receive an identification of upcoming clothing items, including a position with respect to a conveyor belt or other positioning information. In addition, the automated separator may receive a designated sorting bin, separation instructions, or the like, specific to the clothing item.

A fourth section 108 (a.k.a. Section Four) is a sorting section. At the fourth section, the materials stream can be sorted into multiple output locations (e.g., by a separator from the third section 106). The appropriate output location for a particular separation stream may be determined based on the findings in the second section. A plurality of carts or bunkers are provided at each output location, for deposit of separated textile samples for subsequent baling and downstream delivery.

Figure 2:
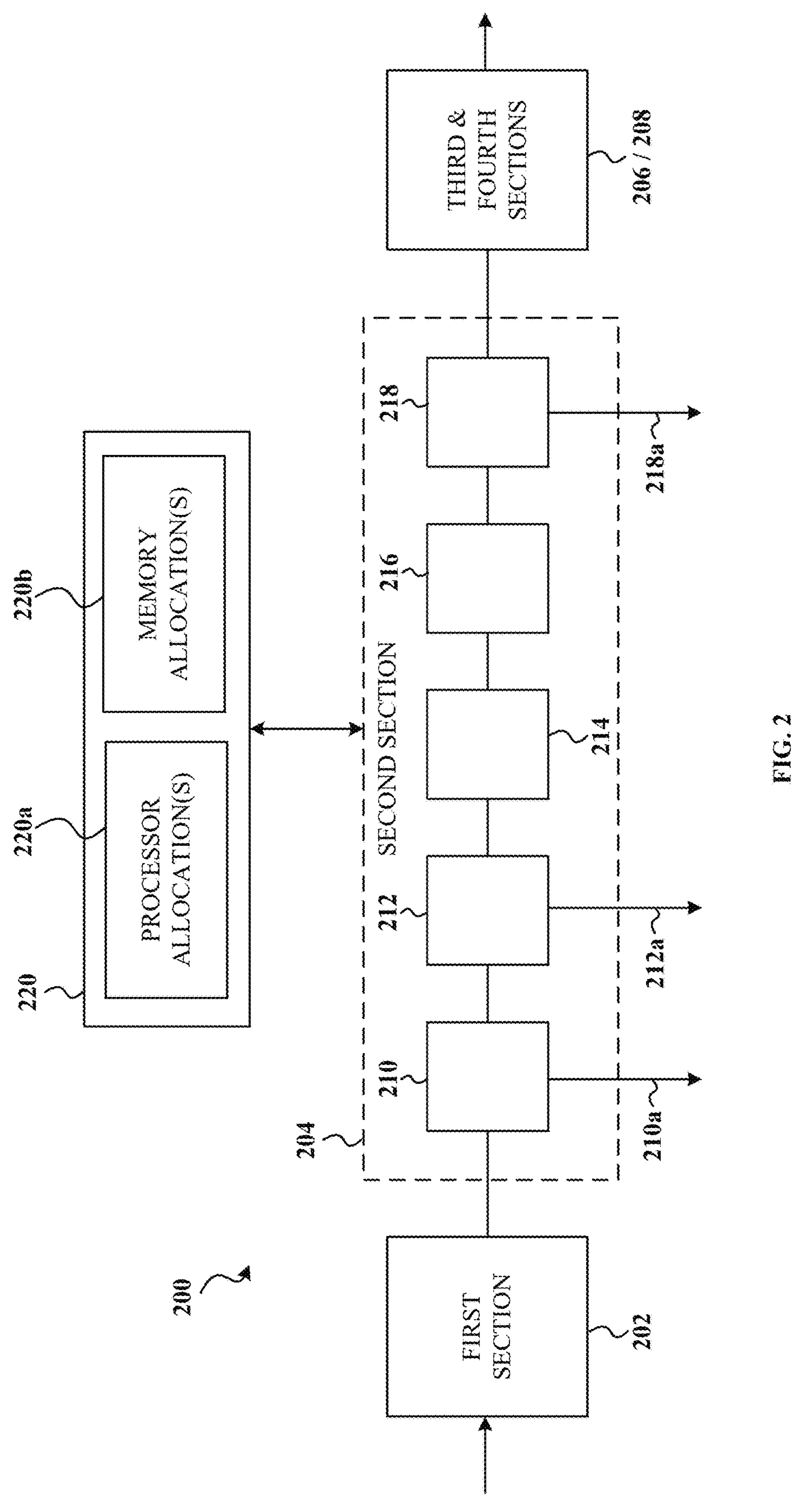
FIG. 2 shows a diagram of the textile sorting system, such as described herein.

FIG. 2 depicts a diagram of a system 200 for sorting and separating textiles. As discussed above, the system 200 may intake textile materials at a first section 202, which may correspond to first section 102 from FIG. 1. The output from the first section 202 may be input to a second section 204.

The second section 204 may include a plurality of subsystems, such as subsystems 210, 212, 214, 216, and 218. Each of these subsystems may be configured to determine a respective attribute of a clothing item and, at the outlet (e.g., into the third and fourth sections 206/208), assign a sorting bin or otherwise provide sorting instructions. It should be understood that subsystems 210, 212, 214, 216, and 218 may be arranged in any suitable order with respect to the second section. For example, in some embodiments, a first subsystem can be implemented as an NIR spectroscopy subsystem having a respective optical sensor configured to detect reflected light in the NIR range and an emitter configured to emit NIR light. In some cases, the first subsystem may include a spectroscopic unit and another subsystem having a visible light camera may be upstream or parallel of the first subsystem. More generally, the terms first, second, third, fourth, and fifth may be used to differentiate one subsystem over another and do not indicate an order along the second section 204.

A camera subsystem 210 may include a plurality of optical detectors configured to capture images of clothing items or garments. The optical detectors may be cameras or other devices comprising an image sensor configured to capture light from a scene and transform the light into a digital signal that may be processed into an image. The cameras may be a visible light camera, though image sensors configured to capture light wavelength ranges other than visible light are envisioned. The image of a clothing item may be used by a predictive model to identify a visual parameter of the garment. Example visual parameters may include a logo, a condition of the garment, a color of the garment, a classification of the garment (e.g., blouse, shirt, pants), an estimated size of the garment, or the like.

The camera subsystem 210 may include a processor allocation and a memory allocation operably coupled to the processor allocation. The processor allocation may be configured to instantiate an instance of software configured to cause the image to be captured and, in response to receiving the image, input the image into a predictive model configured to extract the visual attributes from the garment. For example, the predictive model may extract an edge or contour of the garment to assess the basic shape of the clothing item, which may be used to determine a classification of the garment.

In some examples, the predictive model may additionally and/or alternatively determine a color or color pattern of the clothing item. In some examples, the camera subsystem 210 may employ a transfer learning model, such as ResNet or EfficientNet, to analyze the basic shape of the clothing item and extract other visual information. In some cases, attention mechanisms may be employed. For example, the camera subsystem 210 may be configured to identify a logo within the clothing item. Based on the logo identification, the clothing item may be automatically removed (e.g., via a robotic arm, pneumatic systems, or other separators) from the textile stream. For example, a particular luxury brand may have a garment recycling program in place and thus, in response to identifying a garment having an origin from the particular luxury brand, the garment may be picked out from the camera subsystem 210 (e.g., arrow 210*a*) prior to reaching subsequent subsystems. For example, the garment may be blown using air out of the system (e.g., into a bin proximate to the camera subsystem 210. In some cases, robotic arms may pick out the item.

In some non-limiting examples, extraction of the garment prior to reaching subsequent subsystems may reduce the computational resources used at each station. It should be understood that, in some embodiments, the garment is identified and instructions may be generated for separating the garment at the third and fourth sections 206/208.

In some examples, in response to identifying a logo, the system 200 may be configured to query a database to correspond the logo to a particular brand's logo (e.g., may be extracted from the structure data registry). In response to determining that the identified logo corresponds to a particular brand's logo, the system 200 may retrieve brand data (e.g., enterprise or company information, address, and the like). In some cases, the system 200 may further query a second database that includes data on the enterprise's textile recycling policies. In some examples, a large language model (LLM) may be employed to analyze the textile recycling policies and determine whether the enterprise accepts the clothing items. In some cases, other textile programs (e.g., specialty upcycling programs) may accept used textiles, depending on the brand, material, manufacturing year, model, style, or other criteria. In these examples, a machine learning model or other predictive model may be configured to analyze the criteria and determine, based on the clothing item, whether the criteria is satisfied. For example, the identified logo may correspond to a particular brand's logo from a particular year range. Based on the particular year range and the material (e.g., 100% cashmere wool), the predictive model may determine that the item satisfies the receipt criteria for the recycling program. These and other examples are illustrative and are not intended to limit the disclosure.

Additionally or alternatively, the second section 204 may include a digital tag subsystem 212. The digital tag subsystem 212 may be configured to capture and/or read a tag coupled to the clothing item or garment. In some cases, a tag may refer to a digital tag, such as a digital product passport or digital product identifier. The digital tag refer to a digital watermark (e.g., which may be microscopic or free from a standalone physical tag in the clothing item); a Quick Read (QR) code affixed to a tag or product information within the garment; a radio-frequency identification (RFID) which may be a passive RFID tag, an active RFID tag, a micro-fiber tag, or the like; a near-field communication (NFC) chip, which may be a passive tag (e.g., unpowered) configured to get power from an NFC reader; high-frequency tags; and ultra-high frequency tags. In some examples, the digital tag subsystem 212 may include one or more digital tag readers (e.g., digital watermarks, QR codes, and RFID tag readers).

For clothing and other apparel, the digital tag can contain large amounts of relevant information and data such as (without limitation): (i) the location where the cotton in the material was cultivated; (ii) identity of the fiber manufacture; (iii) identity of thread manufacturer; (iv) location of the cut and sew facility; (v) location of the brand; (vi) identity of the shipping company; (vii) identity of the retailer; (ix) identity of customer, if registered in the brand's portal; (x) what is the alloy of the metal in the zipper; and (xi) what is the resin of the button. Moreover, the digital tag can identify who the brand is. In some cases, the system may be adapted to sort clothing items by brand (e.g., based on the brand indicated by the digital tag scanning), for example, if the brand wants their clothing back to resell it or put it through their repair program as part of a social responsibility commitment. Scanning of digital tags would further allow the system to sort apparel by brand at much greater scale than being able to do that by hand or using existing technologies. For example, the scanner could scan a large collection of clothing where the digital tags may not be in the direct line of sight of the scanner, but still identify the presence of the tags in the collection. This promotes speed and efficiency of the operation.

In some examples, in response to scanning a tag (e.g., by the digital tag scanner), the system 200 may retrieve digital tag data from a database, cloud platform, or other data stores. In some cases, the digital tag data may be stored in manufacturer-specific or brand-specific databases (e.g., accessed via a website or other web-based resources), though a centralized database may be envisioned. In some cases, the data retrieved from the digital data may be used in conjunction with the data extracted from the camera subsystem 210 to generate an attribute profile of the clothing item. In some examples, in response to a brand identification from the camera subsystem 210 being different from a band identification extracted from the digital tag by the digital tag subsystem 212, a system (e.g., a centralized processing system) may override or revise a data entry corresponding to the particular item. In some cases, additional processing may be used to determine a likelihood of counterfeit items, or other reasons for a dissimilar brand identification. In some cases, data from the digital tag may be used to train the predictive model.

In some non-limiting examples, the digital tag subsystem 212 may include cameras configured to scan a non-digital tag and perform optical character recognition on the tag to identify one or more attributes of the clothing item. As described herein, digital tags may include machine-readable fields having fiber composition or material composition such as percentage of cotton, polyester, elastane, and other fabrics; country of origin, and batch/lot identifiers. In some examples, a controller communicably coupled to the digital tag subsystem 212 may parse each field and adapt the retrieved information into a normalized composition vector.

In some examples, the digital tag subsystem 212 may include pneumatic assemblies or robotic arms configured to remove the clothing item from the digital tag subsystem 212 into a separate bin or area (e.g., via arrow 212*a*).

In some examples, in response to retrieving a material composition from the digital tag, the system may store the material composition within a field of a data entry associated with the clothing item. The field(s) may include optional authenticity metadata (e.g., cryptographic signatures). Each field entry may used for later comparison or verification with spectroscopic predictions for the NIR subsystem or other subsystems leveraging predictive models.

Additionally or alternatively, the second section 204 may include a spectral data subsystem 214. The spectral data subsystem 214 may include NIR-based technology that is configured to determine a type of textile material based on the material composition. The spectral data subsystem 214 may include an NIR sensor that captures diffuse reflections of NIR light from the textile sample. The NIR spectrum is captured by a spectrometer in spectral values, each corresponding to a reflected light intensity in a narrow band of NIR wavelengths (e.g., between 750-2500 nm). The spectral data subsystem 214 may include a processor allocation and a memory allocation operably coupled to the processor allocation and configured to instantiate an instance of software configured to cause emission of the NIR light, and in response to receiving reflected light, measuring a change in intensity of reflected light. The amount of absorbed light may correspond to a spectral signature for each material and/or material blend thereof. In some examples, the system may be operable to obtain a vector from the spectrometer and determine the numerical relative composition amounts for each of a plurality of fiber material types such as acrylic, lycra, cotton, polyester and wool.

Alternatively, the spectral data subsystem 214 may include a hyperspectral imaging sensor configured to illuminate a scene and, based on the received split optics from the illuminated scene, detect a plurality of narrow spectral bands (includes NIR) and in response, classify a material on a pixel-by-pixel basis where each pixel includes a high-resolution spectrum. In some cases, the pixel-by-pixel spectral information may be used to classify the clothing item according to a material composition. In some cases, the spectral data subsystem 214 may be configured to detect multi-material garments and positioning thereof.

In some examples, where NIR spectrometry is performed, to operate the NIR subsystem, a controller (e.g., having a processor configured to instantiates an instance software) causes NIR emitter to emit light. The reflect light (e.g., reflected spectra) is captured by a sensor that generates a signal received by the controller. Based on this signal, a predictive material composition is computed that corresponds to the material's spectral signature. Once a predictive material composition is determined, the controller may identify a first sorting bunker. As discussed above the designation and/or final destination of each bunker may be changed according to different bales or batches of textiles received. In some cases, the bunker designations may be changes based on changing industry standards, increases in circularity programs from brands, community needs, and the like. In some examples, the bunker designations may be based on recycler purity specifications and preset recipes.

Additionally or alternatively, the second section 204 may include a metal detector subsystem 216. The metal detector subsystem 216 may include a metal detection sensor. The metal detection sensor may be configured to detect a metal, such as a ferromagnetic material. In response to a ferromagnetic material being detected, a specific sorting bin may be selected. For example, if a clothing item is not accepted by a brand or enterprise or is otherwise eligible for recycling, the clothing items that include metals may be sent to a different recycling facility for recycling metals. In some examples, clothing items with metal hardware may be removed for upcycling.

An output from the metal detector subsystem 216 based on metal detection may be included in the data entry associated with the garment and or clothing item. The data entry may be as a criteria during sorting or bunker designation. For example, to meet an industry standard or an enterprise's standard, garments with metals may be sorted to a particular bunker designated for removal of metal before placement on subsequent bunkers.

In some examples, metal detection may include an inductive or eddy-current sensor configured to detect metals and a driver circuit configured to power one or more coils within the sensor. The driver circuit may be operably coupled to a processor allocation that causes operation of the driver circuit. The sensors may be positioned along the conveyor belt path. In response to a clothing item passing proximate to the sensors, the sensor may activate an excitation coil that generates an oscillating electromagnetic field. A received coil may be configured to detect a change in the electromagnetic field. In response to a change in amplitude, phase, and/or frequency of oscillation, the system is configured to detect that the clothing item includes a metal material, such as a button, zipper, rivets, snaps, hooks, decorative trim, wire, foil, or the like.

It should be understood that the metal detection subsystem 216 may employ other metal detection sensors, such as capacitive sensing elements, millimeter-wave or terahertz sensors, or other suitable sensors, as may be known to one of skill in the art. In some examples, the subsystem 216 may be configured to detect a type of metal within the clothing item, such as brass, stainless steel, aluminum.

Additionally or alternatively, the second section 204 may include a optical subsystem 218. The optical subsystem 218 may include optical sensors, such as a plurality of cameras coupled to a predictive model that is configured to identify a color of the materials and various features relating thereto. The optical subsystem 218 may be operable to scan the garment (e.g., via the cameras) and compare the scanned image to images stored in a database based on the color. A predictive model may be used to analyze the color-based data to determine the age of the garment, the condition of the garment, and/or the origin of the garment. Based on these determinations, the predictive model may be configured to estimate an approximate resale value of the item, determine the estimated remaining life of the time, or determine if the colors detected are associated with stains or other permanent damage to the item.

For example, a database of clothing items may store RBG data and other color patterns of each item. The system may recognize the particular RBG or other color patterns and determine that the clothing item corresponds to a particular year's collection associated with a particular brand. In response to this determination, the system may retrieve the same or similar models from resale market websites to estimate a resale value or likelihood of an individual rewearing the item. In these examples, the clothing item may be assigned a rewearability score and a sorting bin according to the rewearability score. In some examples, the RBG data may indicate that the item corresponds to a particular trademarked color (e.g., such as those from collegiate sports) and assess the demand for the item from one or more sources, such as resale market websites.

In non-limiting embodiments, the optical subsystem 218 may be configured to assess an age of the garment based on the wear (e.g., color fading) of the item. In some examples, in response to receiving an image, an image-based model may be configured to determine changes in color, color saturation, hues, and the like (e.g., by extracting RGB, HSV, LAB values) compared to a reference image (e.g., a similar garment in new condition). The comparison may be based on a pixel-by-pixel comparison of the reference image to the received (actual) image of the garment. In some examples, changes from darker colors to lighter colors may indicate fading. In other examples, changes from light colors to yellowing may indicate extensive wear or age of an item. In some examples, the visual model (e.g., which may be based on a convolutional neural network) may detect changes in texture, such as pilling, thinning of the fabric, wear-related marks (e.g., stretched patters, changes in texture) in high-wear areas (e.g., elbows, knees), or similar. In some examples, abnormal color conditions may be detected, which may indicate a stain or damage to the clothing item.

The visual model may be configured to generate an assessment of the clothing item by condition, by intended sorting bin, or otherwise provide a score to the item. For example, the visual model may classify the item as new, like new, good, fair, poor, damaged, or the like. In some cases, the visual model may assign a score based on a mix of factors, such as wear/fading, value of the item, likelihood of re-wearability, ease of recycling, or the like. In some examples, the optical subsystem 218 may have standalone separation mechanisms (e.g., arrow 218*a*) that can extract particular items for further inspection, in response to the item being in a "new" condition, or other criteria.

More generally, in certain illustrative embodiments, each subsystem 210, 212, 214, 216, and 218 is configured to generate respective fields of data in relation to a clothing item traveling along a conveyor belt. These fields may be used to build a profile for the clothing items. In some cases, the respective fields may be leveraged by one or more predictive systems, such as a machine learning model or a generative model, to determine an end-bin location for the clothing item (e.g., which is determinative of a disposition of the clothing item including sending the item back to the original manufacturing, upcycling hardware and/or fabrics, or dispose in a landfill).

In some examples, a controller associated with the subsystem or with the second section in general may analyze the different data entries to determine a discrepancy measure between (i) the predictive material composition from the spectroscopic model and (ii) a digital tag-retrieved material composition. Based on the discrepancy, the system may select from sources (i) or (ii) based on a confidence of the measurement. While in some cases, the system may assign a higher confidence weight to particular subsystems (e.g., a digital tag may be more accurate than a spectral-based result), in some cases each data entry may have a designated confidence score that is used to select between the different measurements. As another example, a digital tag having a QR code that is faded may have a lower confidence score from a spectroscopic-based measurement. The controller may reassign or override prior bunker designations of the garment to a different bunker when the discrepancy satisfies a criteria or a threshold. For example, a criteria may be associated with a recycler acceptance criteria.

Some of the fields in within the clothing item profile may include (i) fiber composition, (ii) color, and (iii) presence of metal. The computer software associated with the system can be programmed to sort for any combination of those different attributes. For example, a first bunker may be dedicated to clothing items having a 100% polyester fabric. In another example, a different bunker may be dedicated to 100% black-colored polyester fabric. In other non-limiting example, a bunker may be intended for 100% black-colored polyester with no metal materials. In some examples, sorting bins or bunkers may be preset by a user prior to sorting. In some examples, the sorting bins may be based on the intake content. For example, particular intakes may have predominantly winter clothing and thus synthetic materials and metallic materials may be more predominant.

Also, in certain illustrative embodiments, the equipment can enable the user to sort for particular "high value" materials. In some cases, a "high value" material is one that is as close to 100% composition as possible, such as 100% cotton or 100% polyester. Also, light colors tend to be of more value, and if there's no accessory such as buttons, snaps, or zippers or the material, that improves the value of that material as well. Sought-after fabrics, such as alpaca and cashmere, may also be designated as "high value." These examples are provided for illustration purposes only and are not intended to limit a sorting criteria of the disclosure.

In some examples, a high-purity composition bunker may have quantitative acceptance thresholds (e.g., minimum percentage of a target fiber). In some examples, overriding a bunker designation may be to predetermined thresholds to reduce contamination of high-purity streams.

In certain illustrative embodiments, the system may prioritize assessments made by certain substations over others. For example, the system may assign higher weights to one subsystem over other subsystem (e.g., generally downstream subsystems) for the same assessment of a particular clothing item attribute (e.g., material composition). For example, a first subsystem may rely on optical detector readings along with one or more predictive model while a subsequent, second subsystem may be configured to read and extract data from a digital tag. A subsequent spectral data subsystem may use an NIR scanner to assess fiber composition. In certain circumstances, the NIR reading using fiber scanners may indicate that the material is 80%/20% and thus the system may assign the clothing item to a first bunker. However, in response to the digital tag from the manufacturer indicating a material composition of 70%/30%, or 90%/10%, the system may assign the clothing item to a second bunker. Due to the conflicting readings, the system may be configured assign more weight to the digital tag and thus re-direct the material into the second bunker instead of the first bunker. More generally, the multi-subsystem approach may be configured to generate overlapping results such that an accuracy of the sorting results may be improved.

In non-limiting examples, a controller assigns dynamic weights to NIR predictions and tag data based on factors such as NIR model confidence, signal quality, visible soiling/coatings, and tag quality. Based on the weights assigned, data obtained from sources with the higher-confidence values override subsequent and/or preceding scans and the garment may be designated to a bunker corresponding to the higher-confidence values.

In certain illustrative embodiments, different subsystems may include different types of cameras in multiple locations surrounding the material that is being scanned, to confirm or override the NIR-related findings (e.g., from the spectral data subsystem 214). The multiple locations of the cameras also allow for scanning and identification of brand logos on the clothing that may be covered up or hard to see, and not be viewable by, for example, a single camera or scanner positioned above the sort line. One or more robotic arms can be used to grasp the clothing item once the desired brand label is identified on the item. In addition, there could be one or more subsequent air blower areas along the belt for capturing clothing items according to system instructions.

Moreover, in certain illustrative embodiments, the various layers of equipment do not necessarily need to share the same software. Instead, they can each have independent operation, such that a particular brand could be identified by a single scanner and related software and removed from the sort line based on the single identification.

In some embodiments, the second section 204 may be coupled to a device 220 having a processor allocation 220*a* and a memory allocation 220*b* operably coupled to the processor allocation 220*a*. The device 220 may be a server, an edge device, or dedicated hardware, either co-located within the facility or in a cloud architecture. In some cases, the processor allocation 220*a* in operation with the memory allocation 220*b* may provide centralized processing and/or decision-making for the various subsystems in the second section 204. The processor allocation 220*a* may be configured to send instructions and receive outputs from one or more predictive models, such as machine learning models, generative models, to generate the clothing item profile and to generate a sorting assessment, as described above.

As described herein, the predictive model can be implemented using a general machine learning framework that ingests sensor data (e.g., NIR, hyperspectral, visible light images, or the like) and outputs one or more garment attributes. Additionally, the model may generate a sorting decision or handling instructions for the clothing item. As a non-limiting example, the model may indicate that the clothing item should be directed to bin number 3. In other examples, the handling instructions may include "send to ABC Upcycling at 123 Boulevard, City, State 99999." In yet other examples, the handling instructions may be "Remove the brass zippers and then place in bin number 3."

More generally, the model may be configured to receive image data from visible-light cameras, spectral data from near-infrared sensors, and metadata from digital tags, and to produce determinations such as fiber composition, garment type, brand/logo presence, color and condition, and a recommended sorting bunker. The model may be based on supervised learning with labeled datasets of garments and corresponding ground-truth attributes. In some cases, the model may be augmented by semi-supervised techniques to leverage large unlabeled streams. The model can be deployed on edge hardware with low-latency inference and calibrated using reference standards to mitigate sensor drift.

In further embodiments, the predictive model may be a convolutional neural network configured to analyze images of garments and extract visual parameters including a logo, garment class, color distributions, and texture features indicative of wear. The convolutional neural network can be trained end-to-end on annotated garment imagery to output class probabilities and regression scores for condition and size. The image-based outputs can be combined with a separate model trained on near-infrared spectra to predict fiber composition, which may be implemented using chemometric methods (e.g., partial least squares regression/classification) or a one-dimensional convolutional neural network that maps spectral signatures to percentage composition. The system can fuse these outputs with tag-derived composition data using a rules-based controller or a lightweight ensemble model, and when discrepancies between tag data and spectral predictions exceed a threshold, the system can reassign or override a prior bunker assignment of the the garment to a different bunker or a verification lane.

Additionally, the sorting criteria may rely on external data from end markets. In some cases, an AI crawler may leverage models such as LLMs interpreting unstructured or semi-structured textual data associated with garments. As a non-limiting examples, manufacturers may include information on buy-back or take-back program as part of a legal disclosure embedded within a manufacturer's webpage. As another example, an LLM can normalize manufacturer-provided fiber descriptions from digital product passports, parse blend percentages from tag text, and resolve ambiguities in nomenclature across different brands or regions. In some configurations, the LLM may also assist in correlating detected logos with brand databases, which may be stored in a structured data entry within the system. While the image and spectral analyses may be performed by convolutional or other specialized models, the LLM can serve as a complementary component that transforms textual or policy inputs into standardized attributes usable by the sorting decision logic.

In some embodiments, the predictive model can be a convolutional neural network (CNN) for vision tasks, a chemometric or 1D-CNN model for NIR spectra, or the like.

Once the clothing item exits the second section 204, it may be conveyed (e.g., via a conveyor system) to the third and fourth sections 206/208. In some cases, the third section 206 may be above the fourth section 208 such that the clothing items can be moved off the conveyor with air and fall into the predesignated bin. In some examples, the third section 206 may include robotic arms that are operable to pick up the item and drop it into the predesignated bin.

In some cases, reassignment or override decisions occur before the clothing item reaches a separation section 206 ejection window. For example, a controller may update a "first bunker" to a "second bunker" in the data entry so the pneumatic ejectors actuate at the correct position without stopping the conveyor system.

Figure 3:
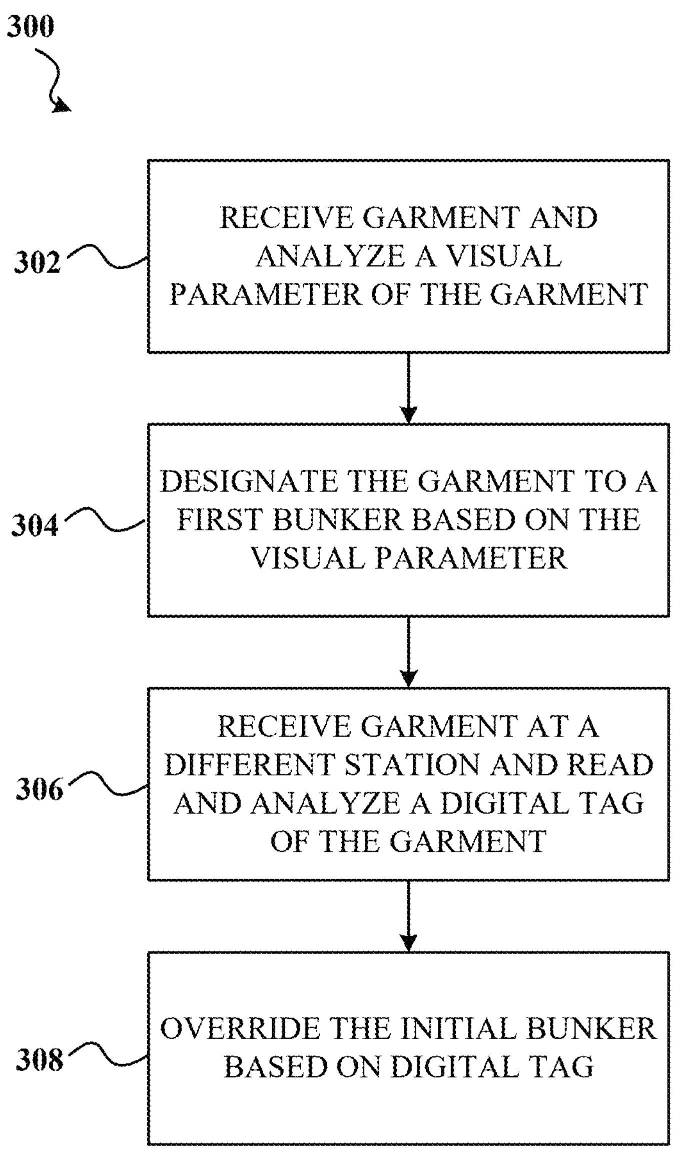
FIG. 3 shows an example method of sorting textiles, such as described herein.

FIG. 3 depicts an example method 300 of sorting a clothing item. At operation 302, a garment is received. The garment may be received at any of the subsystems described above. The garment may be analyzed, using any suitable method such as via visible light images, hyperspectral imaging, IR, NIR, or the like, to extract a visual parameter of the garment. As described above, a visual parameter may refer to color, condition, stain, logo, branding, fiber composition, garment type, or any other clothing attribute that may be obtained via an optical sensor, regardless of wavelength range. The visual parameter may be stored as a field or attribute in a data entry associated with the clothing item.

At operation 304, based on the visual parameter determined from the garment, the subsystem may designate the garment to a first bunker. For example, if the visual parameter is a fiber composition, the first bunker may be configured to accept garments corresponding to the fiber composition. As another example, if the visual parameter is brand-based for a brand with a strong buy-back commitment, the first bunker may be associated with clothing items from the brand.

At operation 306, the garment is received at a different station (e.g., a different subsystem). Once received, a digital tag of the garment may be read (e.g., via an RFID reader, QR code reader, or the like). Data from the digital tag may be retrieved by a web server and structured into respective fields of the data structure associated with the garment. Based on the data of the digital tag, the system may detect that a common field may have conflicting entries. In the example of the fiber composition, a ratio of fabrics may be different from the initial assessment. As another example, the detected brand from the prior station may differ from the brand associated with the digital tag.

In response to the initial assessment being different from a current assessment (e.g., a common field having conflicting entries), at operation 308, the system may override the initial bunker assignment. In some cases, the governing assessment may be based on a weight-based criteria, which favors data from certain sources over data from a sensor or other subsystems. For example, data of a fiber composition, country of origin, or brand, may be more reliable when obtain from a digital tag compared to other sensor-based methods. Thus, conflicting entries on fiber composition may favor the data from the digital tag, thereby overriding an NIR assessment, as one non-limiting example. However, in some examples, observed parameters from the garment may be provided a higher weight compared to a digital tag. For example, if a first subsystem detects that a garment is green in visible light and a second subsystem, using a digital tag reader, determines that the garment is red, the first subsystem may be given higher weight, and thus the initial assessment may not override subsequent assessments. In this example, the system may decide that the difference in color is more likely to be due to a digital tag error.

Figure 4:
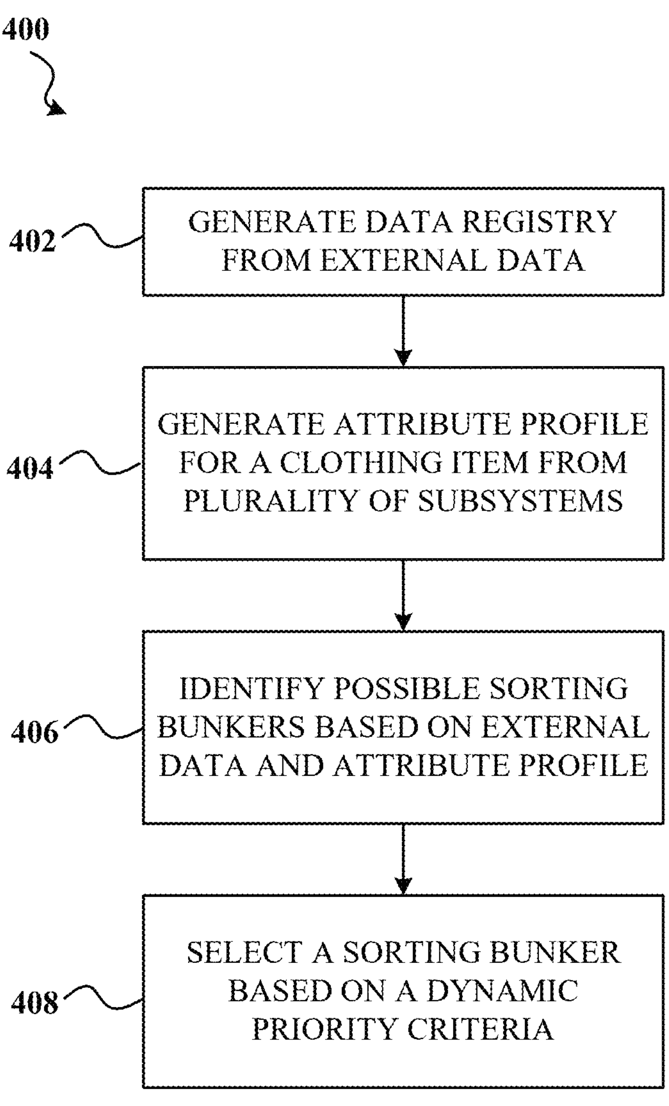
FIG. 4 shows an example method of sorting textiles, such as described herein.

FIG. 4 depicts an example method 400 for sorting a clothing item. At operation 402, a data registry is generated from external data. The external data may include commerce data from a plurality of e-commerce websites, such as secondhand textiles sites, upcycling websites, and the like. In some examples, the plurality of e-commerce websites may be mapped according to each clothing item, per clothing category, per brand, or structured according to other schemas. Additionally, the external data may include take-back, buy-back, or other reuse policies from a plurality of manufacturers. In some examples, the data registry may include data of whether the manufacturer accepts used textiles or clothing, and the constraints for accepting the clothing. For example, some manufacturers may accept any branded item and provide incentives for returning such items. In other examples, some manufacturers may accept clothing in good condition. In other examples, some manufacturers may accept a subset of their manufacturer items, such as jeans but not other items, such as shirts. These examples are provided for illustrative purposes. In some cases, LLMs or other natural language models may be employed to parse the policies and arrange the data according to predefined schemas for retrieval by other predictive models. In some examples, the external data may include data from recycling facilities. For example, certain recycling facilities may accept only leather goods, wool items, or other specialty items. The data from the plurality of data sources may represent end markets for the textiles. Additionally or alternatively, one or more LLMs, machine learning models, or deep learning models may be used to generate circularity scores, which may be used to prioritize assignments of a clothing item to particular bunkers.

At operation 404, a clothing item is received and passes through the analysis section of the system. Based on the plurality of subsystems, an attribute profile may be generated. The attribute profile may include, as non-limiting examples, any one of: fiber composition, color, condition, garment type, style, brand, manufacturer, country of origin, unique ID, size, proof of authenticity, anti-counterfeiting codes, care instructions, manufacturing details, or any combination thereof.

At operation 406, the clothing item is associated with a similar clothing item with respect to the external data. For example, the clothing item may be identified as a 2010 Series A jeans style from Brand A. Based on the external data, the system may identify that the jeans were (in the new condition) $100. In the current condition (e.g., “good,” “damaged”), the jeans may be sold on different secondhand marketplaces for $10 and $15. As another examples, the system may recognize that the manufacturer buys back previously-used jeans for $5. An another example, the system may detect that recycling facilities B and C receive denim for a nominal amount per pound. In yet another example, the system may recognize that a plurality of charities receive jeans. Based on the external data, the system may generate a plurality of possible bunker assignments.

At operation 408, a sorting bunker is selected based on a dynamic priority criteria. The dynamic priority criteria may be based on one or more machine learning models configured to receive, as input, possible bunker assignments, and select a sorting bunker based on a changing priority scale. In some cases, the system may assign the jeans to the plurality of charities bunker (e.g., based on an indication, based on external data, that an external event has caused an increase in demand for the clothing item. As another example, the system may select a near end market based on logistics or other factors. As another example, the system may select a higher monetary end market. As another example, the system may calculate a circularity potential for each of the possible end markets and select the end market based on the circularity criteria. In some examples, the various priorities and criteria may be preconfigured by a human operator.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description but is only limited by the scope of the claims.

The invention claimed is:

1. A system for sorting post-consumer textiles, the system comprising:

a conveyor subsystem configured to convey a garment from an infeed stage to one of a plurality of bunkers;

a first subsystem configured to receive the garment from the conveyor subsystem, the first subsystem comprising:

an optical sensor;

a first memory; and a first processor operably coupled to the first memory, the first processor configured to instantiate an instance of software configured to:

cause light to be emitted towards the garment;

receive reflected light from the garment;

determine a predictive material composition of the garment based on a spectral signature based on the reflected light; and identify a first sorting bunker of the plurality of bunkers for the garment based on the predictive material composition; and a second subsystem configured to receive the garment from the first subsystem, the second subsystem comprising:

a digital tag reader;

a second memory; and a second processor operably coupled to the second memory, the second processor configured to instantiate an instance of software configured to:

cause a digital tag reader to read a digital tag coupled to the garment;

receive data associated with the garment from the digital tag reader;

retrieve a material composition of the garment from the data; and in response to the material composition and predictive material composition having different values, reassigning the garment to a second sorting bunker of the plurality of bunkers, the second sorting bunker different from the first sorting bunker.

2. The system of claim 1, wherein:

the emitted light is within a near-infrared wavelength range;

the optical sensor is a near-infrared sensor configured to receive reflected near-infrared light; and the digital tag reader comprises a radio frequency reader configured to read a radio frequency identifier tag.

3. The system of claim 1, further comprising:

a third subsystem comprising:

a visible light camera;

a third memory allocation; and a third processor allocation operable coupled to the third memory allocation and configured to instantiate an instance of software configured to:

receive an image of the garment captured by the visible light camera;

identify a region within the garment comprising a particular logo;

retrieve, from a first database, a plurality of logos and associate the particular logo with a brand logo from the plurality of logos;

retrieve, from a second database, a circularity policy associated with a brand corresponding to the brand logo; and assign the garment to a particular bunker based on the circularity policy.

4. The system of claim 3, wherein:

the third processor allocation is configured to:

identify, based on one or more visual parameters of the garment, a garment type;

retrieve, from a resale database, an estimated garment price for a similar garment corresponding to the one or more visual parameters of the garment, the garment type, and the logo; and updating a data entry for the garment, the data entry comprising the garment type, the material composition, and the estimated garment price.

5. The system of claim 3, further comprising:

a fourth subsystem comprising a metal detector configured to detect a metal material coupled to the clothing item.

6. The system of claim 5, wherein the metal material is a non-ferrous metal material.

7. The system of claim 1 wherein the infeed stage comprises:

a robotic arm configured to suspend the garment with respect to the conveyor subsystem; and an infeed camera configured to capture one or more visual features of the garment.

8. A system for sorting post-consumer textiles, the system comprising:

a plurality of subsystems comprising:

a first subsystem comprising an optical detector and a garment picker, the first subsystem configured to:

receive a textile stream comprising a plurality of garments including a first garment and a second garment;

identify, via the optical detector, an origin of the first garment from the plurality of garments based on a first visual parameter of the first garment;

in response to identifying the origin of the first garment, cause the garment picker to retrieve the first garment from the textile stream;

scan, via the optical detector, the second garment; and in response to a second visual parameter associated with the second garment failing a selection criteria, conveying the second garment to a second subsystem; and the second subsystem comprising a fiber scanner configured to:

receive the second garment;

determine a fiber composition of the second garment; and select a sorting bunker for the second garment based on the fiber composition.

9. The system of claim 8, wherein identifying the origin of the garment comprises identifying a brand logo associated with the garment.

10. The system of claim 8, comprising:

a third subsystem comprising a metal detector, the third subsystem configured to:

receive the second garment from the second subsystem; and detect a metal material coupled to the second garment.

11. The system of claim 10, further comprising:

a fourth subsystem comprising a camera, the fourth subsystem configured to:

capture an image of the second garment via the camera;

identify, from the image, a color pattern comprising a hue and a color associated with the second garment;

retrieve, from a web server, a reference image associated with the second garment in a new condition;

determine a difference in hue and color between a plurality of pixels corresponding to the image and a plurality of pixels corresponding to the reference image; and determine a garment condition for the second garment based on the difference in hue and color.

12. The system of claim 11, wherein:

in response to the garment condition for the second garment corresponding to at least a like new condition, extracting the second garment from the fourth subsystem by a robotic arm.

13. The system of claim 8, wherein the fiber scanner comprises a near-infrared sensor configured to capture reflected light from the plurality of garments.

14. The system of claim 8, comprising a third subsystem configured to read a digital tag associated with a corresponding garment of the plurality of garments.

15. A system of sorting post-consumer textiles, the system comprising:

a robotic arm assembly configured to manipulate a position of a garment;

a camera configured to capture a substantial portion of a front of the garment and a substantial portion of a back of the garment;

a conveyor belt configured to convey a plurality of garments including the garment along the system;

a memory allocation; and a processor allocation operably coupled to the memory allocation, the processor allocation configured to instantiate an instance of software configured to:

receiving garment image from the camera;

identify, via a predictive model, a plurality of visual parameters of the garment;

determine a classification of the garment based on the plurality of visual parameters; and in response to the classification satisfying a selection criteria, cause removal of the garment from the conveyor belt.

16. The system of claim 15, wherein:

the system comprises:

a near-infrared (NIR) sensor configured to receive reflected NIR light;

a metal detector configured to detect a metal material; and a digital tag reader; and the instance of software is configured to:

determine, based on a corresponding signal from the NIR sensor, a fiber composition of the garment;

identify a hardware coupled to the garment comprising a metal material based on a corresponding signal from the metal detector;

retrieve digital tag data based on a reading of a corresponding digital tag coupled to the garment; and generate a data entry comprising the fiber composition, data associated with the hardware, and the digital tag data.

17. The system of claim 16, wherein the instance of software is configured to:

assign a corresponding weight for the fiber composition, data associated with the hardware, and the digital tag data;

generate a circularity metric based on the weight of each corresponding data entry; and update destination instructions for the garment based on the circularity metric.

18. The system of claim 15, comprising:

a separation stage comprising a plurality of pneumatic assemblies configured to blow air at select garments of the plurality of garments, thereby moving the select garments away from the conveyor belt; and a sorting stage beneath the separation stage configured to receive the select garments.

19. The system of claim 15, wherein the predictive model comprises a convolutional neural network.

20. The system of claim 15, wherein the plurality of visual parameters comprise a color, a texture, a logo, and a shape.

* * * * *